US007192283B2

(12) United States Patent
Paley

(10) Patent No.: US 7,192,283 B2
(45) Date of Patent: Mar. 20, 2007

(54) SYSTEM AND METHOD FOR VISUAL ANALYSIS OF WORD FREQUENCY AND DISTRIBUTION IN A TEXT

(76) Inventor: W. Bradford Paley, 170 Claremont Ave., Suite 6, New York, NY (US) 10024

( * ) Notice: Subject to any disclaimer, the term of this patent is extended or adjusted under 35 U.S.C. 154(b) by 569 days.

(21) Appl. No.: 10/414,075

(22) Filed: Apr. 14, 2003

(65) Prior Publication Data

US 2003/0235807 A1 Dec. 25, 2003

Related U.S. Application Data

(60) Provisional application No. 60/372,282, filed on Apr. 13, 2002.

(51) Int. Cl.
*G09B 5/00* (2006.01)
*G09B 17/00* (2006.01)
(52) U.S. Cl. .................. 434/178; 434/169; 434/307 R; 434/362
(58) Field of Classification Search ................ 434/118, 434/168, 178, 307 R, 322, 323, 362, 365; 704/9, 255, 256.2; 707/9; 715/522, 532; 341/65
See application file for complete search history.

(56) References Cited

U.S. PATENT DOCUMENTS

| | | | |
|---|---|---|---|
| 4,899,148 A * | 2/1990 | Sato et al. .................. 341/65 |
| 5,551,049 A * | 8/1996 | Kaplan et al. .............. 715/532 |
| 5,556,282 A | 9/1996 | Middlebrook |
| 5,713,740 A | 2/1998 | Middlebrook |
| 5,787,395 A * | 7/1998 | Minamino ................... 704/255 |
| 5,793,369 A | 8/1998 | Atkins et al. |
| 5,850,561 A * | 12/1998 | Church et al. .............. 715/532 |
| 5,930,809 A | 7/1999 | Middlebrook |
| 6,052,662 A * | 4/2000 | Hogden .................... 704/256.2 |
| 6,092,038 A * | 7/2000 | Kanevsky et al. ............. 704/9 |
| 6,523,026 B1 * | 2/2003 | Gillis ........................... 707/3 |
| 6,547,831 B1 * | 4/2003 | Kueny ........................ 715/522 |

OTHER PUBLICATIONS

Salton et al., "Automatic Analysis, Theme generation, and Summarization of Machine-Readable Texts", Science, New Series, vol. 264, Issue 5164 (Jun. 3, 1994), pp. 1421-1426.

* cited by examiner

*Primary Examiner*—Joe H. Cheng
(74) *Attorney, Agent, or Firm*—Davidson, Davidson & Kappel, LLC

(57) ABSTRACT

A main computer processing system accesses a text, counts the number of times each word appears, and arranges the words on the display in a way that makes understanding the text easier. On the display, the user can see which words are used most frequently, and the placement of each word gives some information about where it appears in the text. Each word is associated with a graphical drawing that indicates everywhere the word appears in the text (a "Distribution Glyph").

35 Claims, 6 Drawing Sheets

| WORD | COUNT | WORD_POSITIONS_IN_TEXT | DRAWN_WORD_LOCATION | WORD_REFERENCE_LOCATIONS_IN_ARC |
|---|---|---|---|---|
| the | 1637 | 30, 49, 65, 84, 113, 125, 134, ... | (432,383) | (488,78) (490,78) (491,78) (493,78) (496,78) (497,78) (498,78) ... |
| and | 866 | 51, 81, 121, 140, 240, 244, 282, ... | (508,388) | (490,78) (493,78) (496,78) (498,78) (507,79) (508,79) (511,79) ... |
| to | 725 | 38, 55, 180, 185, 205, 210, 250, ... | (509,392) | (489,78) (490,78) (502,79) (502,79) (504,79) (505,79) (508,79) ... |
| she | 541 | 60, 99, 109, 197, 208, 261, 286, ... | (545,370) | (491,78) (494,78) (495,78) (503,79) (504,79) (509,79) (512,79) ... |
| it | 530 | 72, 80, 172, 200, 203, 220, 243, ... | (520,414) | (492,78) (492,78) (501,78) (504,79) (504,79) (506,79) (508,79) ... |
| of | 511 | 42, 52, 86, 127, 137, 177, 280, ... | (477,372) | (489,78) (490,78) (493,78) (497,78) (498,78) (502,79) (511,79) ... |
| said | 462 | 613, 1590, 1649, 1823, 1909, ... | (411,425) | (542,82) (631,98) (636,100) (651,104) (658,106) (673,111) (686,116) ... |
| Alice | 386 | 35, 91, 169, 248, 319, 358, 537, ... | (458,433) | (488,78) (493,79) (501,78) (508,79) (515,79) (519,80) (535,81) ... |
| in | 367 | 79, 102, 165, 298, 327, 652, 656, ... | (489,388) | (492,78) (495,78) (500,78) (513,79) (516,79) (546,82) (546,82) ... |
| yelled | 866 | 23517 | (63,332) | (63,332) |
| yelp | 1 | 9207 | (887,503) | (887,503) |
| Zealand | 1 | 816 | (561,84) | (561,84) |
| zigzag | 1 | 11291 | (781,611) | (781,611) |

SYSTEM AND METHOD FOR VISUAL ANALYSIS OF WORD FREQUENCY AND DISTRIBUTION IN A TEXT

BACKGROUND OF THE INVENTION

1. Field of the Invention

This invention relates to a method and system for reading and displaying a text in a way different from the original form of the text, providing a valuable way of understanding certain characteristics of the text.

2. Description of the Prior Art

Several attempts have been made in the past to create visual or graphical representations of textual works, in order to allow readers to obtain information about the contents of a written text without having to read the words of the text from beginning to end and to thereby understand and gain insight into the text, certain features of the text and its structure.

U.S. Pat. No. 5,556,282 (Middlebrook) teaches the use of cartography to enable one to obtain some comprehension of said text without reading all of the text by mapping a graphic language textscape with regard to typography, graphic or phonetic attributes of selected graphic features, meaning or usage of selected graphic features, statistical analyses of the attributes, meaning, or usage of selected graphic features, or semantic, rhetorical, compositional, thematic, or conceptual configuration. The graphical representation of text within a document is prepared by producing an image of at least some of the text, wherein individual words are indecipherable in the image, identifying at least one common feature contained within the text, such as the physical appearance, phonetics, meaning, usage, definition, location and distribution of text, and segmenting the image into a number of visually distinguishable segments to create a map, wherein each of the visually distinguishable segments corresponds to at least one of the common features in the text, thereby enabling a person viewing the image to comprehend where each common feature occurs within the text without having to read the text.

U.S. Pat. No. 5,713,740 (Middlebrook) also teaches a system for rapidly obtaining information about the contents of a written text without having to read the words of the text by mapping the graphic text image to illustrate, without words, the structure and content of the text with regard to one or more selected features to provide insight into the contents of the text. First, at least one feature within at least a portion of the text is identified, and then at least one representation of that portion of the text is created, wherein the representation of the text does not include any readable words but does include a graphical indication that indicates the presence of said at least one feature at at least one location.

U.S. Pat. No. 5,930,809 (Middlebrook) teaches a method for manipulating text retrieved by a computer so as to allow the user to rapidly obtain information about the text's contents without reading the text. If the text is too large to display on a single screen, a map box is generated on the computer screen and is displayed along with a portion of the retrieved text. Within the map box is displayed a representation of the entire body of text, and a user can use a screen icon to point to any place in the representation of the body of text, which portion is then displayed on the computer screen. The representation of the text in the map box can be mapped in different ways to help inform the user as to the contents of the text prior to it being read.

The Middlebrook patents describe a non-readable, graphical representation of the shape of text portions. This is contrasted with Salton et al., *Automatic Analysis, Theme generation, and Summarization of Machine-Readable Texts, Science*, New Series, Volume 264, Issue 5164 (Jun. 3, 1994), pp. 1421–26, which describes approaches for manipulating and accessing texts in arbitrary subject areas in accordance with the user's needs, such as by automatically determining text themes, traversing texts selectively and extracting summary statements that reflect text content. In order to show results, Salton et al. use an elliptical display that is merely an outer shell that makes links among the nodes easier for a user to see, and the interior space of the ellipse is not used for content. Salton et al. could just as easily have displayed (and perhaps be more readable) a vertical list of the texts involved, with curved links looping out away from the text, joining related vertices.

The scope of the display of Salton et al. is large text collections, and its purpose is to show how texts or portions of texts are similar. The technology revolves around sophisticated statistical analysis, including complex statistics, math, or scaling procedures, involving creation of weighted term vectors expressing the similarity of all pairs of texts. It also sets an arbitrary lower limit on the display of a link between two texts based on the similarity measure. The intent of Salton et al. is to simplify and screen out most of the text, although it actually shows barely any of the content of the text, relying on automatic techniques to decide what is important.

U.S. Pat. No. 5,793,369 (Atkins et al.) teaches a method for displaying lines of computer source code in a reduced, reshaped or colored manner to determine information about the computer code's structure, use, age, authors or other details. This contrasts with the invention described herein in that the present invention uses a circular layout for the text around the page, and words in the present invention are displayed individually rather than in the text lines in which they originally occurred. It also contrasts in that the primary method of displaying the new information in Atkins et al. is by changing visual attributes in place (without moving lines), whereas the primary method of displaying new information in the present invention is by arranging the positions of the words.

There exist techniques that provide new information about texts by arranging the positions of the words. One such technique is called Multidimensional Scaling, and is described in the book "Modern Multidimensional Scaling, Theory and Applications", by Ingwer Borg and Patrick Groenen (Springer, ISBN 0-387-94845-7, Library of Congress BF39.2.M85B67 1977). Another such technique is called Self-Organizing Maps, described in the book "Self-Organizing Maps", by Teuvo Kohonen (Springer, ISBN 3-540-67921-9, Library of Congress). The present invention differs from the above techniques in its particular method of placing words by averaging. The averaging technique used in the current application is considerably easier to calculate and apply, and has an important advantage of being understood by lay people (using a rubberband analogy, detailed below) much more easily.

SUMMARY OF THE INVENTION

The invention provides a system and means for providing a single-page visual display of a text that allows the user to see which words are used most frequently and how words are distributed in the text. It provides some of the functions of an index, some of the functions of a concordance (a listing of all words in a text and a count of how many times each word appears) and new functions related to its form.

First, the main processing system according to the invention accesses the text and reads in the words, one by one. As each word is read, it is added to a database that contains a plurality of records (one for each word), each record containing a plurality of fields (the word itself, the number of times that it has occurred (its "Count"), and a list of all of its numeric places within the text, e.g., 1st word, 4th word, 5,238th word).

Second, the words are positioned on a display about a central region, such as along the edge of an ellipse, starting at the top center of and proceeding clockwise around the ellipse. Each word is positioned at a point (the "Word Use Position") along the circumference of the ellipse, whose position measures linearly along the circumference from the starting point at the top, and is proportional to the position of the word in the text.

Third, the words are drawn on the display. Each word is drawn only once, at the average of all of its positions, the "Drawn Position". The average position is calculated by simply summing all of the positions and dividing by the number of positions summed.

Fourth, each word is drawn in a color or a shade of a color that helps indicate its Count. Thus, words with the highest Count are drawn in a shade very distinct from the background, whereas words with the lowest Count are drawn in a shade close to the background color (but still readable). Words with intermediate Counts are drawn in intermediate shades.

The above steps are described here sequentially for ease of understanding but can be done all at once in the preferred embodiment. They could also be done independently, in full view of the user, with animated transitions between the steps.

Fifth, a Distribution Glyph according to the invention can be drawn next to specific words. In the preferred embodiment, this graphical object takes the form of a point with radiating lines, the central point is drawn at the Drawn Position of the word and one line is drawn to each Word Use Position around the ellipse. In one embodiment, this glyph is drawn only when the user indicates interest in the word, by clicking on the word, typing the word or resting the computer cursor over the word.

The invention is well suited to supporting interactive analysis of text. It provides an immediate understanding of the most commonly used words in a text because, when the human eye scans over the display, the most common words stand out strongly against the background. It provides a general clue to a word's distribution in the text by positioning the word close to the places it appears most frequently.

The invention can be used in any field that requires analysis of data that can be represented in textual format, including but not limited to literature, newspaper articles, Web sites, music, genomic sequences, financial information, legal depositions, patent documents, research papers, and non-fiction works.

The invention's clear display of word frequency and distribution, as well as the large number of words that can be seen at any one time, can be very valuable for many types of analysis. It can help the user get a sense for the vocabulary of the author, the main characters, the key themes, major places, and a general feeling of the settings and character of the text—what filmmakers call mise-en-scene. It can help people understand where major characters enter and exit, giving a structural view of a play or story. The invention can help show major events relating to a company if news stories are fed to it, and, since the industry, stock ticker symbols and competitors are often mentioned, it provides a way to get all of this information about a company. It acts as an index, allowing people to go directly to the part of a text that develops one idea to the greatest depth. It can act as a "multiple index" directing people to places in the text that deal with two words together, but not individually (e.g., Mad and Hatter, not the words individually).

The invention can expose structure in a text and show that a text has many distinct episodes. For example, in *Alice's Adventures in Wonderland*, the many different episodes deal with characters like the Mouse, Caterpillar, Mad Hatter, Mock Turtle and Gryphon (who appear in isolated regions), the King and Queen (who appear in a couple of episodes), and the White Rabbit (who appears at the beginning, end and in-between episodes). It can support many other insights, too—one of its important features is that it lays out the entire text at once (so all themes are available to memory instantly), and puts them into a spatial representation where insights are sometimes more easily won.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE INVENTION

Figures 5, 6:
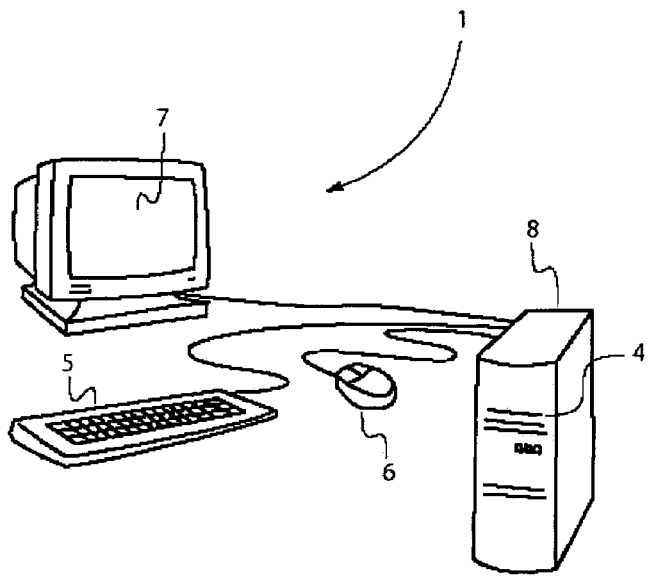
FIG. 5 shows an example of a database of words, containing a record for each word in the text.
FIG. 6 shows an example of a computer system on which the present invention may be prepared.

The system of the present invention may be implemented, for example as shown in FIG. 6, on a standard computer 1, with a keyboard 5, mouse 6, display 7, central processing unit 8 and storage device 9 (such as a hard drive) connected in the usual way, and a program that executes the steps to display and manipulate a text according to the methods of the invention.

Figure 7:
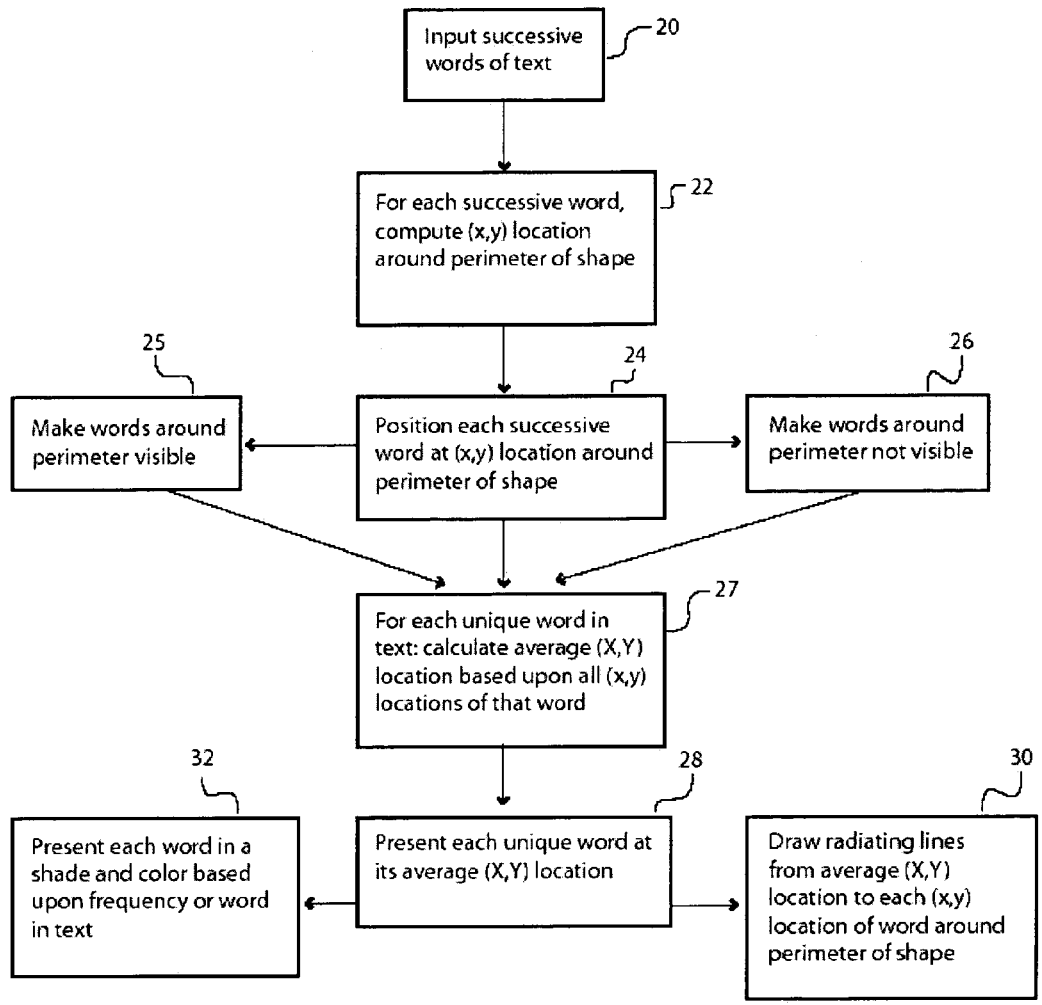
FIG. 7 shows a flowchart of the general steps of the invention.

The system of the present invention is generally prepared by the following general method steps, as set forth in the flow chart of FIG. 7. First, the main processing system according to the invention accesses the text and reads in the words, one by one (block 20). As each word is read, it is added to a database that contains a plurality of records (one for each word), each record containing a plurality of fields (the word itself, the number of times that it has occurred (its "COUNT"), and a list of all of its numeric places within the text, e.g., 1st word, 4th word, 5,238th word).

Figure 1:
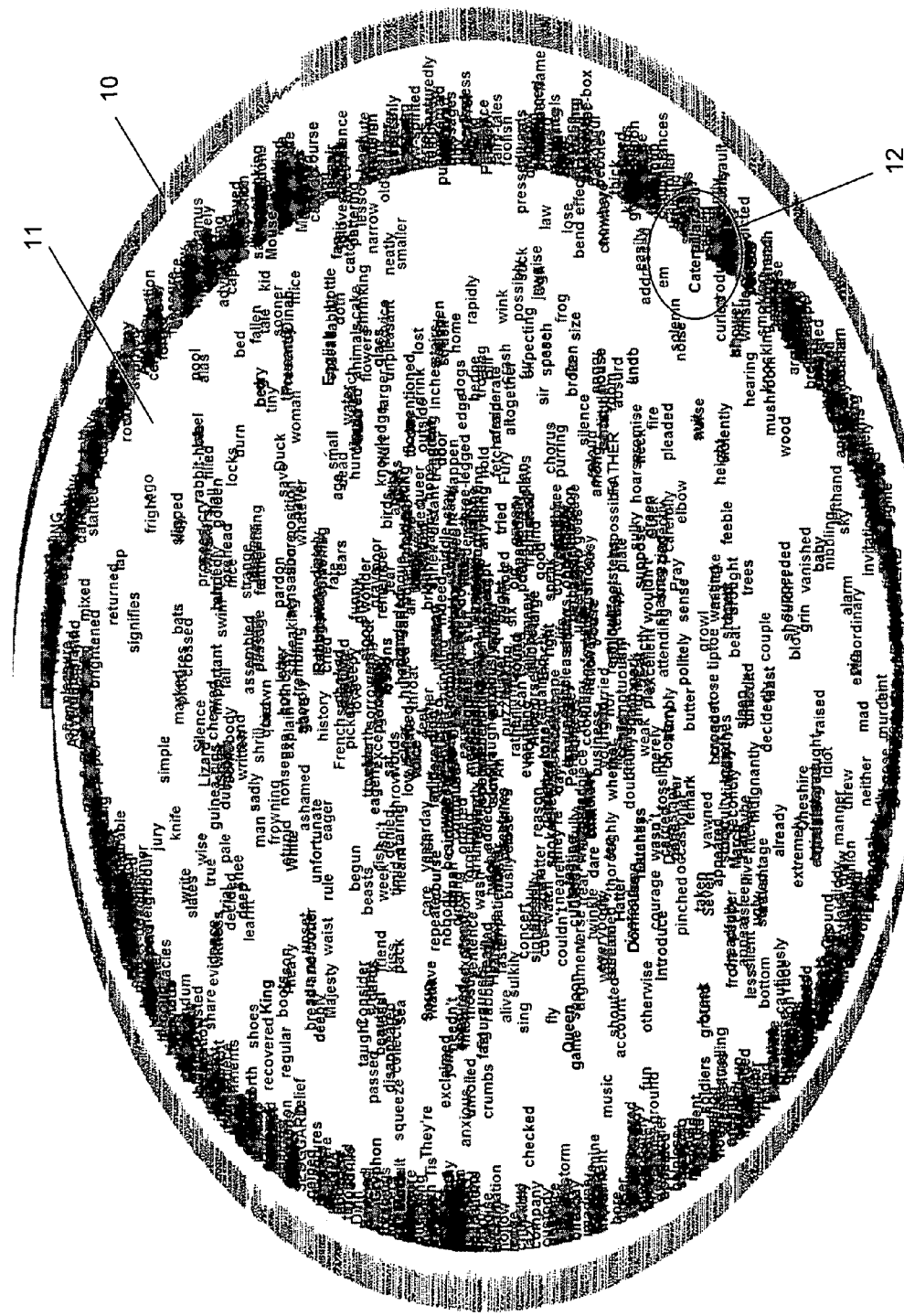
FIG. 1 shows a display prepared of the text of *Alice's Adventures in Wonderland* in accordance with the present invention.

Second, the words of the text are positioned on a display as shown for example at 10 in FIG. 1, about a central region 11, such as along the edge of a circle or more preferably an ellipse, starting at the top center of and proceeding clockwise around the ellipse (block 24 of FIG. 7). Each word is positioned at a point (the "WORD_REFERENCE_LOCATION_IN_ARC") along the circumference of the ellipse, at a position measured linearly along the circumference from the starting point at the top and proportional to the position of the word in the text. For example, the first word is positioned at the top center, a word halfway into the text (e.g., word 5,000 of a 10,000 word text) is positioned halfway around the ellipse (or at the bottom center), a word three-quarters of the way into the text (e.g., word 7,500 of a 10,000 word text) is positioned at the farthest left point of the ellipse.

Third, the words are drawn on the display within the circle or ellipse (block 28 of FIG. 7). Each word is drawn only once, at the average of all of its positions in the text and around the circumference of the ellipse, the "DRAWN_WORD_LOCATION". The average position is calculated by simply summing all of the positions and dividing by the number of positions summed (block 27 of FIG. 7).

For example, if a word appears only once in the text, it will be drawn exactly at that point along the ellipse. If a word appears twice, e.g., at the beginning (center top) and middle (center bottom) of the text, the word will be drawn on the display in the central region of the text. Arithmetically, for example, if the ellipse is 1001×501 units in size, the text is 10,000 words long, and the word appears only twice, at the beginning (place 1) and middle (place 5,000) in the text, then its positions will be [500, 0] (the top of the ellipse) and [500, 500] (the bottom of the ellipse), the average position will be [500, 250]. Accordingly, the word will be drawn at [500, 250] on the display. If the word appears frequently, it will be drawn at a position on the display that is the average of all its appearance positions.

Fourth, the word will be drawn in a color or a shade of a color that helps indicate its COUNT, i.e., how many times it appears in the text (block 32 of FIG. 7). Words with high COUNT are drawn in a shade very distinct from the background. Words with low COUNT are drawn in a shade close to the background color, although still readable. Words with intermediate COUNT are drawn in intermediate shades. For example, if the background is white, words with the highest COUNT are drawn in black, and words with a COUNT of one are drawn in light gray. Words with intermediate COUNT are drawn in shades of gray. In a preferred embodiment, words are drawn in color contrast according to ascending COUNT order, i.e., from lowest COUNT to highest COUNT, so that words with the darker shades draw over words with the lighter shades.

The above steps are described here sequentially for ease of understanding. In a preferred embodiment, these steps can be done all at once. They could also be done independently, in full view of the user, with animated transitions between the steps.

Fifth, a "Distribution Glyph" according to the invention can be drawn for specific words. In the preferred embodiment, this graphical object takes the form of a point with radiating lines (block 30 of FIG. 7). The central point is drawn at the DRAWN_WORD_LOCATION of the word, and one line is drawn to each screen position around the ellipse that is in the list WORD_REFERENCE_LOCATIONS_IN_ARC. In the preferred embodiment, this glyph is drawn only when the user indicates interest in the word, by clicking on the word, typing the word or resting the computer cursor over the word.

Referring now to the drawings, FIG. 1 shows a display prepared of the text of Alice's Adventures in Wonderland in accordance with the present invention. In FIG. 1, the word "Caterpillar" has a medium-dark shade and appears close to the edge on the right side as indicated at 12. This word is drawn in medium-dark shade because of its relative frequent appearance. Also, this word is drawn very close to the edge of the ellipse because Caterpillar is mentioned many times in only one part of the story, i.e., the part of the text corresponding to a position about ⅓ of the way around the circumference of the ellipse. However, Caterpillar does appear once in another place within the text, thus resulting in this word being pulled slightly toward the interior of the ellipse. The effects of averaging every position in which a word appears around the ellipse can be understood with a physical analogy: imagine that a word is drawn on a small tile, and that a rubber band is attached from that tile to each position that the word appears in the story around the ellipse. The tile will be held in a position that is a weighted average of its positions along the circumference of the ellipse but will be pulled closest to the part of the story that anchors the most rubber bands.

Figure 2:
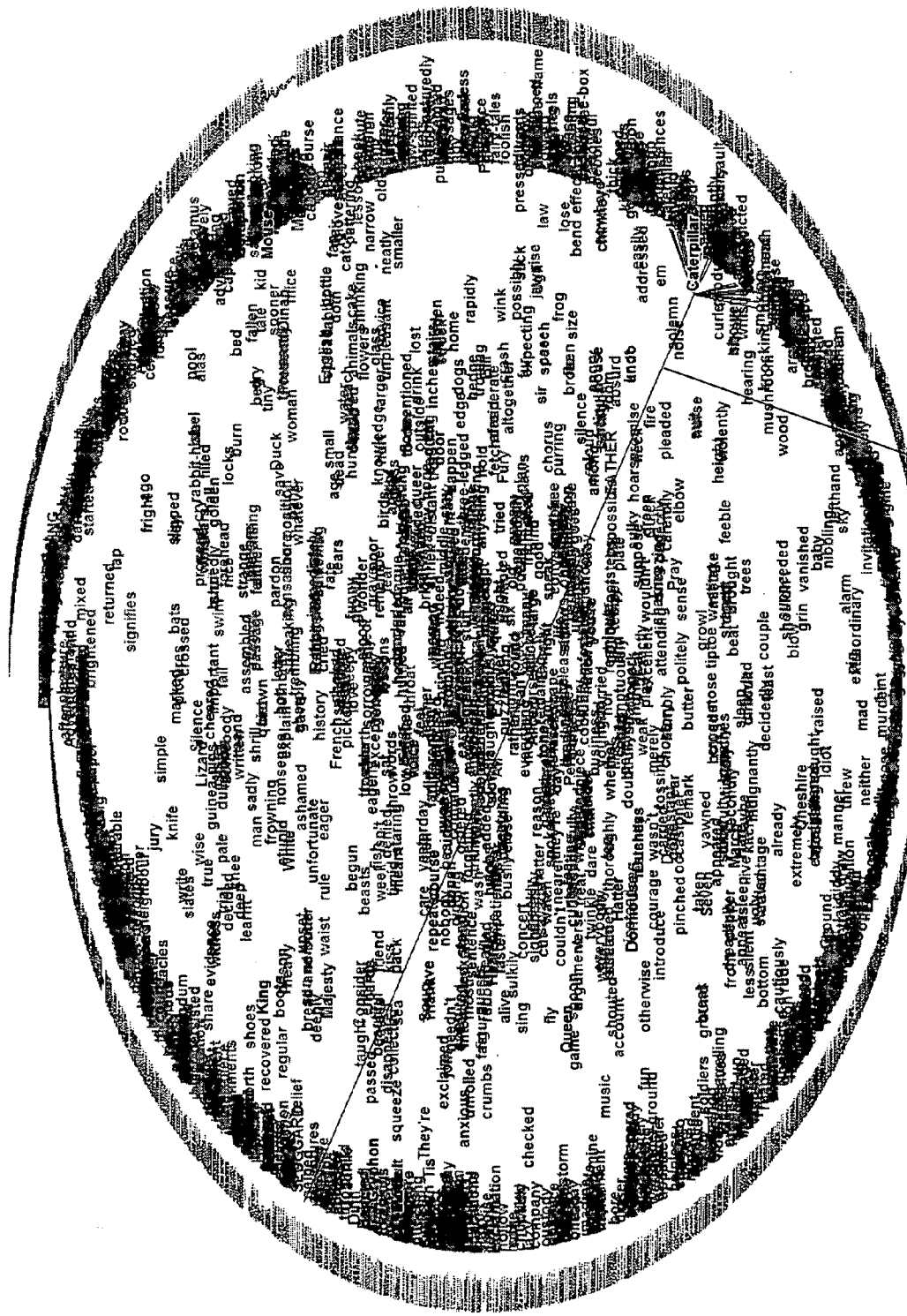
FIG. 2 shows the display of FIG. 1 wherein a distribution glyph is shown of the word "Caterpillar"

The invention also provides more detailed information about a word's distribution when the Distribution Glyph is drawn, as shown in FIG. 2, which shows the display of FIG. 1 wherein a Distribution Glyph is drawn about the word "Caterpillar". The rays 13 emanating from the chosen word and extending to the edges of the ellipse provide a visual representation of the rubber band analogy, as the positions in the story at which the word "Caterpillar" is mentioned can be seen as the end-points of the rays emanating from the word "Caterpillar".

Figure 4:
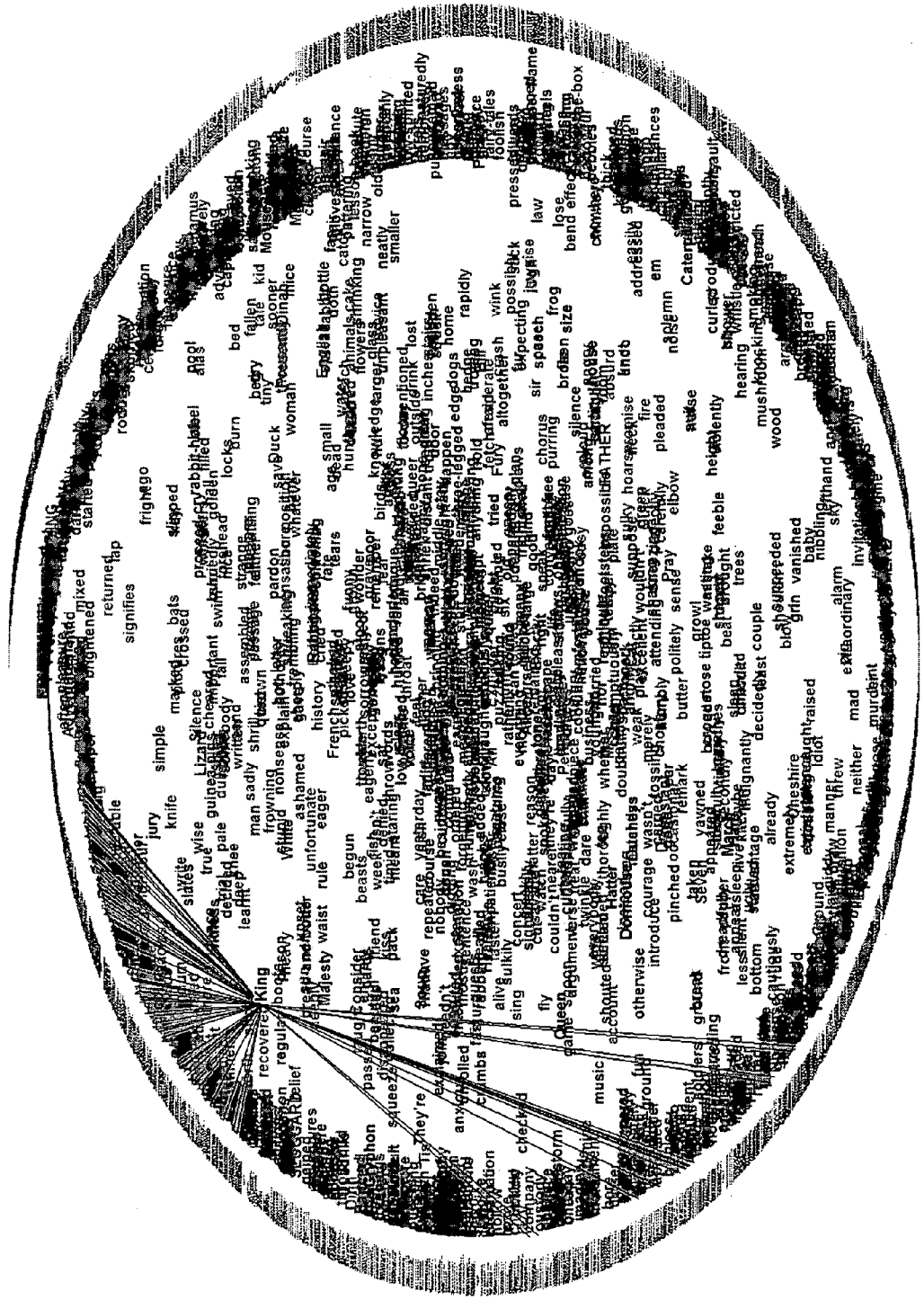
FIG. 4 shows the display of FIG. 1 wherein a distribution glyph is shown of the word "King"

Similarly, FIG. 4 shows the display of FIG. 1 wherein a Distribution Glyph is shown of the word "King". The word "King" has a different distribution within the text that does the word "Caterpillar", i.e., the distribution is mainly in one portion of the text but the word also appears in isolated instances in several other portions, as shown in FIG. 4.

Figure 3:
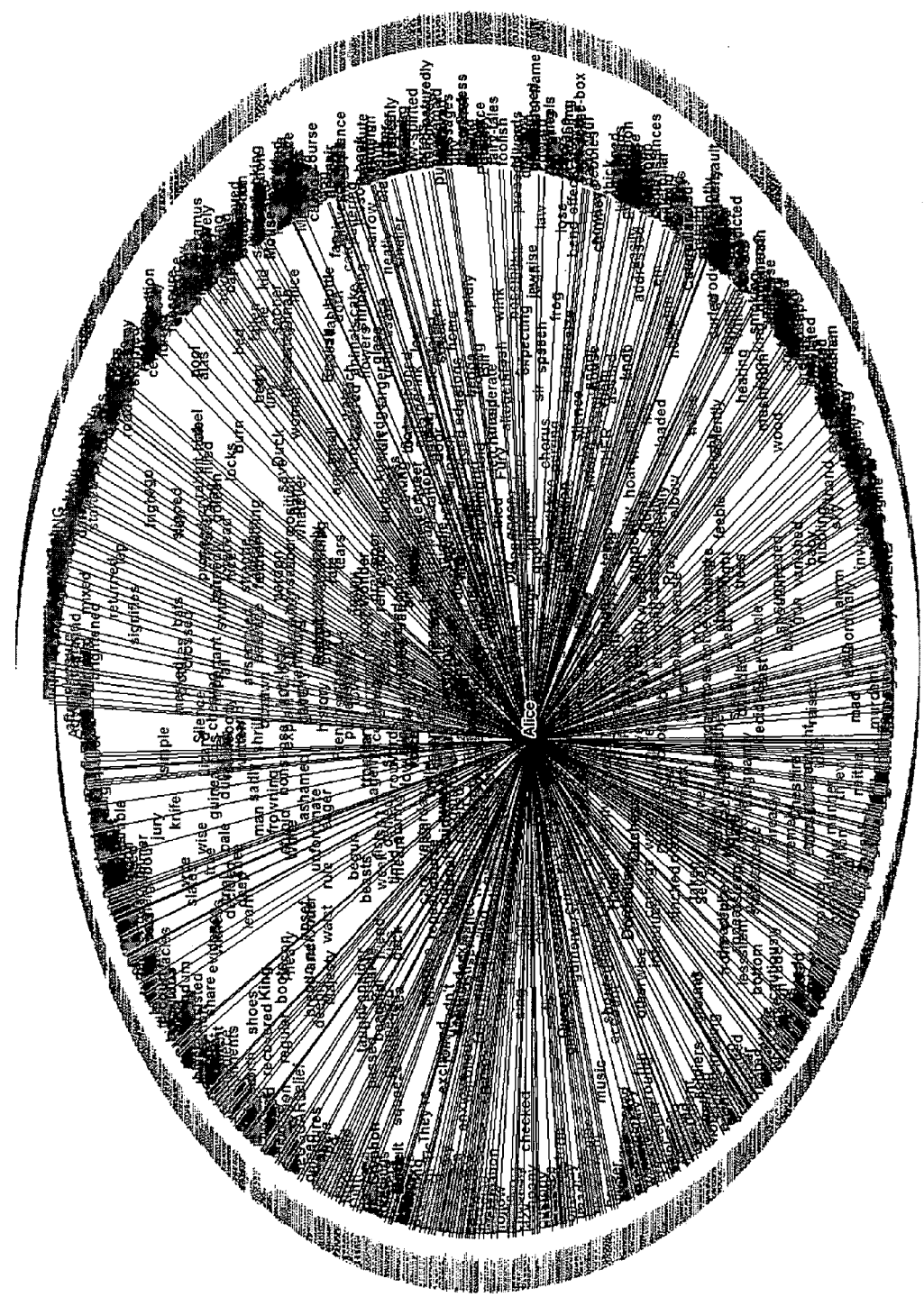
FIG. 3 shows the display of FIG. 1 wherein a distribution glyph is shown of the word "Alice"

The word "Alice", on the other hand, is mentioned virtually everywhere in the story, as can be seen by studying the Distribution Glyph for the word "Alice", shown in FIG. 3. The word "Alice" is drawn at almost the exact center of the interior of the ellipse, with rays emanating to a great many positions around the circumference of the ellipse, indicating that this word appears throughout the text. In addition, the word "Alice" is drawn in the darkest color to indicate that it is the most frequently used word in the text.

The following are the steps implemented in the preferred embodiments of the present invention.

First, a database of words and word positions is created, with a record for each individual word that appears in the text. This database can be called CONCORDANCE, as illustrated in FIG. 5. Each record contains a plurality of fields. The first field stores the individual word, called WORD. The second field stores a number, called COUNT, which is the number of times that this word appears in the text. The next field is a collection of numbers called WORD_POSITIONS_IN_TEXT, storing numbers which are the positions within the text at which this word appears. The next field is an x/y pair of numbers, or coordinates, called DRAWN_WORD_LOCATION, which is the position within the display at which the word is drawn, based upon its positions around the circumference of the display. The final field is a collection of x/y pairs of numbers called WORD_REFERENCE_LOCATIONS_IN_ARC, which are this word's positions around the circumference of the display, the average of which circumferential positions results in the exact position within the display at which the word is drawn.

This database CONCORDANCE can be created in the following manner:
Starting at the beginning, read the text word by word.
Count the total number of word positions in the text (including for words that are repeated), and call this number TOTAL_WORD_POSITIONS_IN_TEXT.
Count the number of different words in the text, and call that total NUM_WORDS_IN_TEXT. This will enable the creation of a table with data field entries for each different word in the text, whether repeated or not.
Create a table having a row for each different word, i.e., having NUM_WORDS_IN_TEXT separate rows, each row having data field columns as follows: WORD, COUNT, WORD_POSITIONS_IN_TEXT, DRAWN_WORD_LOCATION, and WORD_REFERENCE_LOCATIONS_IN_ARC.
Start with the first word in the text, call it THIS_WORD, and proceed as follows for every word in the text.
Create a counter called THIS_WORD_POSITION_IN_TEXT, and set it=to 1.
Find_This_Word_Decision: determine if there an existing record in CONCORDANCE for THIS_WORD:
If there is not an existing record for THIS_WORD, then:
Create a new record (row) in the CONCORDANCE
set the WORD field to the value of THIS_WORD (i.e., store the word in the WORD field)
set the COUNT field to 0
Go to the Fill_Record step, below
If there is an existing record for THIS_WORD, then:
Find the record for THIS_WORD in CONCORDANCE
Go to the step Fill_Record, below
Determine how far along the ellipse, starting at the top center and proceeding clockwise, this word's use position should be, and call this θ (THETA). The (x,y) location is obtained by using the formula for a circle as follows:

$$\text{Ratio} = \frac{\text{THIS\_WORD\_POSITION\_IN\_TEXT}}{\text{TOTAL\_WORD\_POSITIONS\_IN\_TEXT}}$$

θ=π/2-Ratio * 2 * π (this formula scales Ratio to a full circle and makes θ start at the top of the circle and proceed clockwise as Ratio goes from 0 to 1). θ (THETA) determines how far along the ellipse, starting at the top center and proceeding clockwise, each word use position should be.

$$X = (\text{cosine of } \theta) * (\text{width of display}) + \frac{(\text{width of display})}{2}$$

$$Y = (\text{sine of } \theta) * (\text{height of display}) + \frac{(\text{height of display})}{2}$$

Decision: are there more words in the text?
If there are more words in the text, then:
Proceed to the next word in the text, and call it THIS_WORD
Go to the Find_This_Word_Decision step above
If there are no more words in the text, then:
Store the final value of THIS_WORD_POSITION_IN_TEXT as the value of TOTAL_WORD_POSITIONS_IN_TEXT (the total number of word positions)
proceed to Find_Drawn_Word_Position below
Interactive_Display_Loop: Next, it must be determined where within the field of the display each individual word in the text is to be drawn and how darkly it is to be drawn.

Find_Drawn_Word_Position:
Retrieve the first record in CONCORDANCE, call it THIS_RECORD
For THIS_RECORD, retrieve the first (x,y) pair in the list called WORD_REFERENCE_LOCATIONS_IN_ARC, and call it THIS_REFERENCE
Create a new (x,y) pair and insert it as the field DRAWN_WORD_LOCATION in THIS_RECORD, and set this new (x,y) pair as (0,0).
Add_Reference_Location: Add the (x,y) pair THIS_REFERENCE to the (x,y) pair DRAWN_WORD_LOCATION in THIS_RECORD (this is done by adding the x from THIS_REFERENCE to the x in DRAWN_WORD_LOCATION, and adding the y from THIS_REFERENCE to the y in DRAWN_WORD_LOCATION)
Decision: is there another (x,y) pair in the list called WORD_REFERENCE_LOCATIONS_IN_ARC?
If yes, then:
Get the next (x,y) pair from the list WORD_REFERENCE_LOCATIONS_IN_ARC
Call it THIS_REFERENCE
Go to Add_Reference_Location step above
If not, then:
proceed to Divide_to_Get_Final_Location, below
Divide_to_Get_Final_Location: Find the average position for this word. This can be calculated by adding all X's and all the Y's in the x/y pairs for this record, dividing each sum by the number of x/y pairs, and storing these respective averages in the X part and Y part of the DRAWN_WORD_LOCATION x/y pair, and storing this as the DRAWN_WORD_LOCATION x/y pair, as shown below:
Divide the x in the DRAWN_WORD_LOCATION (x,y) pair for THIS_RECORD by the total number of (x,y) pairs in the list WORD_REFERENCE_LOCATIONS_IN_ARC for THIS_RECORD
Divide the y in the DRAWN_WORD_LOCATION (x,y) pair for THIS_RECORD by the total number of (x,y) pairs in the list WORD_REFERENCE_LOCATIONS_IN_ARC for THIS_RECORD
Once the database CONCORDANCE has been created, it can be displayed on the computer screen in the following manner:
Sort the database CONCORDANCE based on the COUNT field, from smallest to largest.
Go through the database CONCORDANCE, considering each word in turn, from the word(s) with the smallest COUNT value to the word(s) with the largest COUNT value.
Display each word in its corresponding position within the display: For each record, draw the word WORD in the record at the position DRAWN_WORD_LOCATION.
Draw the word for this CONCORDANCE record at the DRAWN_WORD_POSITION on the display, in the appropriate shade of gray. This gray shade can be calculated as $$\text{gray shade} = \frac{\text{COUNT}}{\text{LARGEST\_COUNT} * 0.75} + 0.25$$

where 0.25 indicates a faint but readable shade of gray, and 1.0 indicates the shade of gray (black, in the figures) that most contrasts with the background (white in the figures)).

Once the words are displayed on the screen, the display can be made interactive in the following manner:

Store the largest COUNT of any record in CONCORDANCE in a variable called LARGEST_COUNT Whenever the user moves the cursor over a word, look up that word in the CONCORDANCE and draw the Distribution Glyph. The Distribution Glyph can be drawn for that word by drawing a line from the DRAWN_WORD_POSITION of that word to each of the x/y pairs in WORD_USE_POSITIONS.

The invention can operate as an interactive program or be printed out as a static paper print. Because paper can have much finer resolution than current computer screens, the Distribution Glyphs can be much smaller, but still carry the same information.

A print version of the invention follows all of the same rules as above, and adding the following step called Display_All_Distribution Glyphs before the Find_Drawn_Word_Position step in the Interactive_Display_Loop:

Draw the print Distribution Glyph for this CONCORDANCE record. This can be done by drawing a shorter line, part of the way from the DRAWN_WORD_LOCATION to each of the x/y pairs in WORD_REFERENCE_LOCATIONS_IN_ARC. Thus, the rays would not extend completely from the word to the circumference of the ellipse but would be shorter, so as to give the Distribution Glyph the appearance of a "starburst". For example, the line could be drawn $\frac{1}{20}^{th}$ of the way from the word to the edge of the ellipse. If REFERENCE_LOCATIONS_IN_ARC [n].X denotes, in standard computer language indexing notation, the X part of the $n^{th}$ x/y pair in REFERENCE_LOCATIONS_IN_ARC, then the X part of the end point of the shorter line can be calculated as (REFERENCE_LOCATIONS_IN_ARC [n].X—DRAWN_WORD_LOCATION.X)/20+DRAWN_WORD_LOCATION.X, and the Y part of the end point of the shorter line can be calculated as (REFERENCE_LOCATIONS_IN_ARC[n].Y—DRAWN_WORD_LOCATION.Y)/20+DRAWN_WORD_LOCATION.Y. As shown in these formulae, these determinations must be made with respect to the center of the small starburst that we are creating, i.e., the position of the word, not the edge of the display The invention above can use an ellipse rather than the circle that is described by the mathematical formulas above. In order to make a horizontal ellipse, one could scale the x part of each (x,y) pair just before displaying a word at that (x,y) position. A horizontal ellipse is appropriate for languages, such as English, that have horizontally-oriented words because words do not need to be "pulled apart" as much in the vertical direction in order to make them more readable. Likewise, in order to make a vertical ellipse, one could scale the y part of each (x,y) pair just before displaying a word at that (x,y) position. A vertical ellipse is appropriate for languages, such as Japanese, that have vertically-oriented words.

The beginning and end of the text can be made more obvious by using a very shallow spiral rather than a circle or ellipse (this is the actual shape used in FIGS. 1–3). The spiral is created by making the radius of the circle that is created by the sine and cosine functions shorter as we approach the end of the text. For example, in the step Fill_Record above, we could add a Radius value to the mathematical operations as follows, creating the desired shallow ellipse:

$$\text{Radius} = 1 - \text{Ratio}/10$$

$$X = (\text{cosine of } \theta) * \text{Radius} * (\text{width of display}) + \frac{(\text{width of display})}{2}$$

$$Y = (\text{sine of } \theta) * \text{Radius} * (\text{height of display}) + \frac{(\text{height of display})}{2}.$$

The invention can use figures other than ellipses to distribute the text about a display. Simply substituting formulas for other parametric shapes in step 8b will allow the invention to be based on a square, rectangle, triangle, circle, or an arbitrary blob shape, for example.

If X/Y/Z triplets are used rather than x/y pairs, this invention can be made to work in three dimensions. A simple addition to the Divide_to_Get_Final_Location step above (setting Z to THIS_WORD_PLACE) will make a helix-based text representation that can be displayed using standard 3D computer graphics techniques. Higher dimensional shapes can also be the basis for creating higher-dimensional text representations, with similar adjustments to the data stored, and any means of displaying higher-dimensional data can be used to display them.

If the simple averaging techniques above cause too many words to crowd around the middle of the display and thereby reduce readability, the positioning can be changed to reduce the crowding. One method of changing the positions would be to add another step after all of the DRAWN_WORD_LOCATIONs are calculated, but before any words are displayed. This new step would determine how close each word is to the center of the display and move it away from the center, keeping it on the same radius, reducing the amount it is moved to zero as it approaches the outside of the circle, ellipse or spiral. One example technique (of many techniques) for doing this smoothly is known as a "Fish-Eye" or Hyperbolic display, and can be seen in the document "A Focus+Context Technique Based on Hyperbolic Geometry for Visualizing Large Hierarchies," By John Lamping, Ramana Rao and Peter Pirolli, in the proceedings of the ACM SIGCHI conference of 1995, as found on Apr. 13, 2003 at the Web address http://www.acm.org/sigchi/chi95/Electronic/documnts/papers/jl_bdy.htm.

If the simple averaging techniques above cause too many words to be drawn over one another and thereby reducing readability, the positioning can be changed to reduce the overlapping. One method of reducing overlapping would be to use Force-Directed Placement, as described in the book by T. M. J. Fruchterman and E. M. Reingold, "Graph Drawing by Force-directed Placement," Software-Practice and Experience, vol. 21(11), Pages 1129–1164, November 1991.

While we have hereinbefore described a number of embodiments of this invention, it is apparent that our basic constructions can be altered to provide other embodiments which utilize the processes and compositions of this invention. Therefore, it will be appreciated that the scope of this invention is to be defined by the claims appended hereto rather than by the specific embodiments which have been presented hereinbefore by way of example.

What is claimed is:

1. A method of providing a graphical representation of a textual work comprising a plurality of words, each word appearing at one time in the text, comprising:

inputting each of the words of the text into a database;

determining with a processor the position that each word of the text would have along said perimeter if it were measured linearly along the perimeter of the shape proportional to the position of the word in the text;

positioning the plurality of words of the text on a display along a perimeter of a predetermined shape, each successive word being positioned at a position measured linearly along the perimeter of the shape proportional to the position of the word in the text; and presenting each word that appears in the text within a central region of the shape at a location that is the average of all of its position along the perimeter of the shape.

2. The method of claim 1, wherein said step of positioning the words comprises positioning each successive word at a position measured along the perimeter of said shape in the same consecutive order as in the text.

3. The method of claim 1, wherein said shape is a circle or ellipse, and said step of positioning the words of the text comprises positioning each successive word at an (x,y) position along the circumference of said circle or ellipse, wherein the (x,y) position is determined by the following formulas:

$$x = (\cos\theta)*(\text{width of shape}) + \frac{(\text{width of shape})}{2}, \text{ and}$$

$$y = (\sin\theta)*(\text{height of shape}) + \frac{(\text{height of shape})}{2},$$

where $$\theta = \pi/2 - \frac{p}{n}*2*\pi,$$

p=position number of the word in the text, and
n=total number of word positions in the text.

4. The method of claim 3, wherein θ determines how far along the circumference of the circle or ellipse, starting at the top center and proceeding clockwise, each successive word's position should be.

5. The method of claim 1, wherein said step of positioning the words comprises positioning each successive word at an (x,y) position along the perimeter of said shape.

6. The method of claim 5, wherein said step of presenting each word at a location that is the average of all of its positions comprises presenting each word at an (X,Y) location within the central region of the shape, wherein the (X,Y) location is determined by the following formulas:

$$X = \frac{\sum x_p, \text{ for } p=1 \text{ to } n}{n}$$

$$Y = \frac{\sum y_p, \text{ for } p=1 \text{ to } n}{n},$$

where p=position number of the word in the text, and
n=total number of word positions in the text.

7. The method of claim 1, wherein said step of presenting each word comprises presenting each word within the central region of the shape in a shade of text darkness or in a color that provides an indication of the number of times that said word appears in the text.

8. The method of claim 7, wherein said step of presenting each word within the central region of the shape in a shade of text darkness comprises presenting each word in a shade of text darkness "s" from 0.25 to 1.0 times the darkest shade, with "s" being determined by the following formula:

$$s = \frac{w}{W*0.75} + 0.25,$$

where w=total number of times the word appears in the text, and
W=largest number of times any word appears in the text.

9. The method of claim 1, further comprising the step of drawing, for a chosen word, one radiating line at least part of the way from the presented location of that word within the central region of the shape to each position of that word along the perimeter of the shape.

10. The method of claim 9, wherein each chosen word is positioned at w (x,y) positions along the perimeter of said shape, where w =total number of times the chosen word appears in the text, and each word is presented at an (X,Y) location within the central region of said shape, wherein the step of drawing, for the chosen word, one radiating line comprises drawing a line between the chosen word's (X,Y) location within said shape and each of the chosen word's w (x,y) positions along the perimeter of said shape.

11. The method of claim 10, wherein said shape is a circle or ellipse, and the chosen word's (X,Y) location and each of the chosen word's w (x,y) positions are determined by the following formulas:

$$y = (\sin\theta)*(\text{height of shape}) + \frac{(\text{height of shape})}{2},$$

$$X = \frac{\sum x_p, \text{ for } p=1 \text{ to } n}{n}, \text{ and}$$

$$Y = \frac{\sum y_p, \text{ for } p=1 \text{ to } n}{n},$$

where $$\theta = \pi/2 - \frac{p}{n}*2*\pi,$$

p=position number of the word in the text, and
n=total number of word positions in the text.

12. The method of claim 9, wherein said step of drawing one radiating line to each position of that word takes place when a computer cursor is rested over the chosen word.

13. The method of claim 1, wherein said shape is a circle, ellipse, square, rectangle, triangle or any arbitrary shape.

14. The method of claim 1, wherein said step of positioning further comprises presenting each of said words along said perimeter so that each of said words is visible.

15. The method of claim 1, wherein said step of positioning further comprises determining with the processor the position that each word would have along said perimeter but not making each of said words visible.

16. A graphical representation of a textual work comprising a plurality of words, each word appearing at one time in the text, and each of the words of the text having been input into a database, comprising:

a perimeter pattern comprising the words of the text positioned on a display along a perimeter of a predetermined shape, each successive word being positioned at a position measured linearly along the perimeter of the shape proportional to the position of the word in the text, and each of said successive word positions along said perimeter of the predetermined shape having been determined with a processor; and a central region pattern comprising each word that appears within the text being presented within a central region of the shape at a location that is the average of all of its position along the perimeter of the shape.

17. The representation of claim 16, wherein said perimeter pattern comprises each successive word positioned along the perimeter of said shape in the same consecutive order as in the text.

18. The representation of claim 16, wherein said shape is a circle or ellipse, and said perimeter pattern comprises each successive word positioned at an (x,y) position along the circumference of said circle or ellipse, wherein the (x,y) position is determined by the following formulas:

$$x = (\cos\theta) * (\text{width of shape}) + \frac{(\text{width of shape})}{2}, \text{ and}$$

$$y = (\sin\theta) * (\text{height of shape}) + \frac{(\text{height of shape})}{2},$$

where $$\theta = \pi/2 - \frac{p}{n} * 2 * \pi,$$

p=position number of the word in the text, and
n=total number of word positions in the text.

19. The representation of claim 18, wherein θ determines how far along the circumference of said circle or ellipse, starting at the top center and proceeding clockwise, each successive word's position should be.

20. The representation of claim 16, wherein said perimeter pattern comprises each successive word positioned at an (x,y) position along the perimeter of said shape.

21. The representation of claim 20, wherein said central region pattern comprises each word presented at an (X,Y) location within the central region of the shape, wherein the (X,Y) location is determined by the following formulas:

$$X = \frac{\sum x_p, \text{ for } p = 1 \text{ to } n}{n}$$

$$Y = \frac{\sum y_p, \text{ for } p = 1 \text{ to } n}{n},$$

where p=position number of the word in the text, and
n=total number of word positions in the text.

22. The representation of claim 16, wherein said central region pattern comprises each word presented within the central region of the shape in a shade of text darkness or in a color that provides an indication of the number of times that said word appears in the text.

23. The representation of claim 22, wherein said each word in the central region pattern is presented in a shade of text darkness "s" from 0.25 to 1.0 times the darkest shade, "s" being determined by the following formula:

$$s = \frac{w}{W * 0.75} + 0.25,$$

where w=total number of times the word appears in the text, and
W=largest number of times any word appears in the text.

24. The representation of claim 16, further comprising a distribution indication comprising, for a chosen word, one radiating line drawn at least part of the way from the presented location of that word in the central region pattern to each position of that word in the perimeter pattern.

25. The representation of claim 24, wherein said perimeter pattern comprises each chosen word positioned at w (x,y) positions along the perimeter of said shape, where w=total number of times the chosen word appears in the text, and said central region pattern comprises each word presented at an (X,Y) location within the shape, wherein said distribution indication, for the chosen word, comprises one radiating line drawn between the chosen word's (X,Y) location within said shape and each of the chosen word's w (x,y) positions along the perimeter of said shape.

26. The representation of claim 25, wherein said central region is in the shape of a circle or ellipse, and the chosen word's (X,Y) location and each of the chosen word's w (x,y) positions are determined by the following formulas:

$$x = (\cos\theta) * (\text{width of shape}) + \frac{(\text{width of shape})}{2},$$

$$y = (\sin\theta) * (\text{height of shape}) + \frac{(\text{height of shape})}{2},$$

$$X = \frac{\sum x_p, \text{ for } p = 1 \text{ to } n}{n}, \text{ and}$$

$$Y = \frac{\sum y_p, \text{ for } p = 1 \text{ to } n}{n},$$

where $$\theta = \pi/2 - \frac{p}{n} * 2 * \pi,$$

p=position number of the word in the text, and
n=total number of word positions in the text.

27. The representation of claim 26, wherein said distribution indication is presented when a computer cursor is rested over the chosen word.

28. The representation of claim 16, wherein said shape is a circle, ellipse, square, rectangle, triangle or any arbitrary shape.

29. The representation of claim 16, wherein each of the words of said perimeter pattern is presented on the display along said perimeter such that each of said words is visible.

30. The representation of claim 16, wherein said processor determines the position that each of the words of said perimeter pattern would have along said perimeter but said word is not made visible.

31. A computer-readable storage medium containing a set of instructions for a general purpose computer having a screen display, the set of instructions instructing the computer to perform the following steps of:

accepting input into a database each of a plurality of words of a textual work, each word appearing at least one time in said text; determining with a processor the position that each word of the text would have along a perimeter of a predetermined shape if said position were measured linearly along the perimeter of the shape proportional to the position of that word in the text;

positioning the plurality of words of the text on a display along a perimeter of a predetermined shape, each successive word being positioned at said position measured linearly along the perimeter of the shape proportional to the position of the word in the text; and presenting each word that appears in the text on the display within a central region of the shape at a location that is the average of all of its position along the perimeter of the shape.

32. The computer-readable storage medium of claim 31, wherein said set of instructions further instructs the computer to present each word within the central region of the shape in a shade of text darkness or in a color that provides an indication of the number of times that said word appears in the text.

33. The computer-readable storage medium of claim 31, wherein said set of instructions further instructs the computer to draw, for a chosen word, one radiating line at least part of the way from the presented location of that word within the central region of the shape to each position of that word along the perimeter of the shape.

34. The computer-readable storage medium of claim 33, wherein said set of instructions instructs the computer to draw said radiating line when a computer cursor is rested over the chosen word.

35. The computer-readable storage medium of claim 31, wherein said set of instructions instructing the computer to the plurality of words instructs said computer to position each of said words along said perimeter without making said words visible on the display.

* * * * *